US010233127B2

(12) United States Patent
Atakan

(10) Patent No.: US 10,233,127 B2
(45) Date of Patent: Mar. 19, 2019

(54) CEMENT CHEMISTRIES

(71) Applicant: Solidia Technologies, Inc., Piscataway, NJ (US)

(72) Inventor: Vahit Atakan, West Windsor, NJ (US)

(73) Assignee: Solidia Technologies, Inc., Piscataway, NJ (US)

(*) Notice: Subject to any disclaimer, the term of this patent is extended or adjusted under 35 U.S.C. 154(b) by 159 days.

(21) Appl. No.: 15/409,352

(22) Filed: Jan. 18, 2017

(65) Prior Publication Data

US 2017/0204010 A1 Jul. 20, 2017

Related U.S. Application Data

(60) Provisional application No. 62/280,296, filed on Jan. 19, 2016, provisional application No. 62/281,260, filed on Jan. 21, 2016.

(51) Int. Cl.
| *C04B 7/00* | (2006.01) |
| *C04B 40/02* | (2006.01) |
| *C04B 28/00* | (2006.01) |
| *C04B 28/18* | (2006.01) |
| C04B 7/34 | (2006.01) |
| C04B 28/34 | (2006.01) |
| C04B 32/00 | (2006.01) |
| C04B 7/32 | (2006.01) |
| C04B 7/36 | (2006.01) |
| C04B 9/11 | (2006.01) |
| C04B 11/28 | (2006.01) |
| C04B 28/06 | (2006.01) |

(52) U.S. Cl.
CPC ........ *C04B 40/0231* (2013.01); *C04B 28/006* (2013.01); *C04B 28/188* (2013.01); Y02P 40/165 (2015.11); Y02P 40/18 (2015.11); Y02W 30/92 (2015.05); Y02W 30/94 (2015.05)

(58) Field of Classification Search
USPC ........................................ 106/638, 692, 696
See application file for complete search history.

(56) References Cited

U.S. PATENT DOCUMENTS 4,683,151 A * 7/1987 Hamaguchi ......... C04B 35/6316
427/397.8
2006/0272549 A1* 12/2006 Mathur .................... C01B 33/24
106/464
(Continued)

FOREIGN PATENT DOCUMENTS

| JP | 2656782 B2 * | 9/1997 | .............. C04B 28/06 |
| KR | 100999438 B1 * | 12/2010 | .............. C04B 28/14 |

Primary Examiner — James E McDonough
(74) Attorney, Agent, or Firm — Dentons US LLP

(57) ABSTRACT

A cementitious composition comprising a crystalline phase and an amorphous phase, and an activator selected from the group of materials comprising inorganic bases. In some cases the crystalline phase is gehlenite. In some cases the crystalline phase is anorthite. In some cases the amorphous phase is amorphous calcium aluminum silicate. In some cases the activator is elected from OPC (1-70 wt %), free lime (1-20 wt %), calcium hydroxide (1-20 wt %), and alkali hydroxides (NaOH, KOH 1 to 10 wt %), individually or in combination. A low lime cementitious material is cured by reaction with a curing reagent that includes a reagent chemical that is synthesized from $CO_2$. Examples of such a reagent are oxalic acid and tartaric acid.

7 Claims, 15 Drawing Sheets

(56) References Cited

U.S. PATENT DOCUMENTS

2009/0143211 A1* 6/2009 Riman .................. B01D 53/62
                                                   501/1
2010/0154675 A1* 6/2010 Stone ....................... C09D 1/06
                                                  106/286.3
2017/0320781 A1* 11/2017 Atakan ................. C04B 14/041

* cited by examiner (a)

(b)

(c)

CEMENT CHEMISTRIES

CROSS-REFERENCE TO RELATED APPLICATIONS

This application claims priority to and the benefit of U.S. provisional patent application Ser. No. 62/280,296, filed Jan. 19, 2016, and of U.S. provisional patent application Ser. No. 62/281,260, filed Jan. 21, 2016, each of which applications is incorporated herein by reference in its entirety.

FIELD OF THE INVENTION

The invention relates to cementitious/pozzalonic materials in general and particularly to cements that are cured in the present of an activator. and to cements that cure by reaction with carbon dioxide.

BACKGROUND OF THE INVENTION

Cements of various types have been used in construction for thousands of years, including in concrete. Conventional cements set in the presence of water.

Marcus Vitruvius Pollio, a Roman architect and engineer in the 1st century BCE wrote his "Ten books of Architecture". (Vitruvius, "The Ten Books of Architecture," Harvard University Press, 1914) Writing about concrete floors, for example, he said:

"First I shall begin with the concrete flooring, which is the most important of the polished finishings, observing that great pains and the utmost precaution must be taken to ensure its durability". (page 202)

"On this, lay the nucleus, consisting of pounded tile mixed with lime in the proportions of three parts to one, and forming a layer not less than six digits thick." (page 203)

The Romans also knew of cement that could set under water.

"There is also a kind of powder [POZZOLANA] from which natural causes produces astonishing results. This substance, when mixed with lime and rubble, not only lends strength to buildings of other kinds, but even when piers are constructed of it in the sea, they set hard under water." (Vitruvius, pages 46-47.)

Today, ordinary Portland cement, OPC is synthesized in cement kilns at high temperatures about 1450° C. During this production, about 1 ton of $CO_2$ emitted per ton of OPC produced. There have been several attempts to decrease the $CO_2$ emissions. The first approach is to increase the efficiency of the cement kilns. Today, the most efficient cement kiln can reduce the $CO_2$ emissions from 1 ton to 816 kg per ton of OPC. The second approach is to blend the cement clinker with supplementary cementitious materials, SCM, which are mainly fly ash, slag and sometimes with burnt oil shale. These SCM's are by products of other processes. However, the major problem with SCM is the variation from source to source, abundance, and geographical dependence of the sources.

Concrete is the second most utilized material on earth after water. Concrete is made of cement, water sand and aggregate. Among the concrete components, ordinary Portland cement (OPC) is produced in high temperature kilns and during cement production about 1 ton of $CO_2$ is emitted per ton of cement produced. Due to high volume of cement production worldwide, the cement industry is responsible for 5% of global $CO_2$ emissions. There have been attempts on reducing the $CO_2$ emission in the cement industry.

Cement is typically made of limestone and shale to form the major phases of alite ($C_3S$ in cement chemist notation, $Ca_3SiO_5$, sometimes formulated as $3CaO.SiO_2$) and belite (C2S in cement chemist notation, $Ca_2SiO_4$, sometimes formulated as $2CaO.SiO_2$). Both alite and belite are rich in calcium and they hydrate in the presence of water.

There is a need for sustainable cements that can be manufactured with low $CO_2$ emissions in the existing cement plants with the existing raw material with a reliable and sustainable supply chain, and that consume $CO_2$ as a reagent.

SUMMARY OF THE INVENTION

According to one aspect, the invention features a cementitious material, comprising: a crystalline phase and an amorphous phase, and an activator selected from the group of materials comprising inorganic bases.

In one embodiment, the activator is a selected one of OPC (1-70 wt %), free lime (1-20 wt %), calcium hydroxide (1-20 wt %), and alkali hydroxides (NaOH, KOH 1 to 10 wt %), individually or in combination.

In another embodiment, the amorphous material comprises amorphous calcium aluminum silicate.

In yet another embodiment, the crystalline phase comprises in its majority crystalline gehlenite.

In still another embodiment, the crystalline phase comprises in its majority crystalline anorthite.

According to one aspect, the invention features a method of curing a cementitious material that is cured by reaction with $CO_2$ and does not cure by reaction with water alone, comprising the steps of: providing a quantity of the cementitious material that is cured by reaction with $CO_2$ and does not cure by reaction with water alone in uncured form; and exposing said cementitious material to a curing agent comprising a reagent chemical that is synthesized from $CO_2$ for a time sufficient to cure said cementitious material.

In one embodiment, the reagent chemical that is synthesized from $CO_2$ is a compound that can be synthesized from $CO_2$.

In another embodiment, the reagent chemical that is synthesized from $CO_2$ is oxalic acid.

In yet another embodiment, the reagent chemical that is synthesized from $CO_2$ is tartaric acid.

In still another embodiment, the reagent chemical that is synthesized from $CO_2$ is water soluble.

In a further embodiment, control of the reaction between the cementitious material and the reagent chemical that is synthesized from $CO_2$ is accomplished by one or more of the use of additives, by controlling the reactivity of the cementitious material by controlling its crystallinity, by control of a particle size of particles in the cementitious material, by control of the surface area of the particles in the cementitious material, and by control of the composition of the cementitious material.

In another aspect the invention relates to a method of curing a cementitious material comprising the steps of: providing a quantity of a cementitious material comprised of at least one of a calcium silicate, a magnesium silicate, a calcium alumino silicate, a magnesium alumino silicate, gehlenite, and mellilite; adding a predetermined quantity of at least one of a material comprising Al content, a material comprising Mg content and a material comprising Fe content of the cementitious material; and exposing the cementitious material to a curing agent comprising a reagent chemical that is synthesized from $CO_2$ for a time sufficient to cure the cementitious material.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 13A illustrates 1D oriented fiber-shaped bonding elements in a dilute bonding matrix (bonding elements are not touching).

FIG. 13B illustrates 2D oriented platelet shaped bonding elements in a dilute bonding matrix (bonding elements are not touching).

FIG. 13C illustrates 3D oriented platelet shaped bonding elements in a dilute bonding matrix (bonding elements are not touching).

FIG. 13D illustrates randomly oriented platelet shaped bonding elements in a dilute bonding matrix (bonding elements are not touching), wherein the composite materials includes the bonding matrix and filler components such as polymers, metals, inorganic particles, and aggregates.

FIG. 13E illustrates a concentrated bonding matrix (with a volume fraction sufficient to establish a percolation network) of bonding elements where the matrix is 3D oriented.

FIG. 13F illustrates a concentrated bonding matrix (with a volume fraction sufficient to establish a percolation network) of randomly oriented bonding elements, wherein filler components such as polymers, metals, inorganic particles, aggregates etc. may be included.

DETAILED DESCRIPTION

Figure 1:
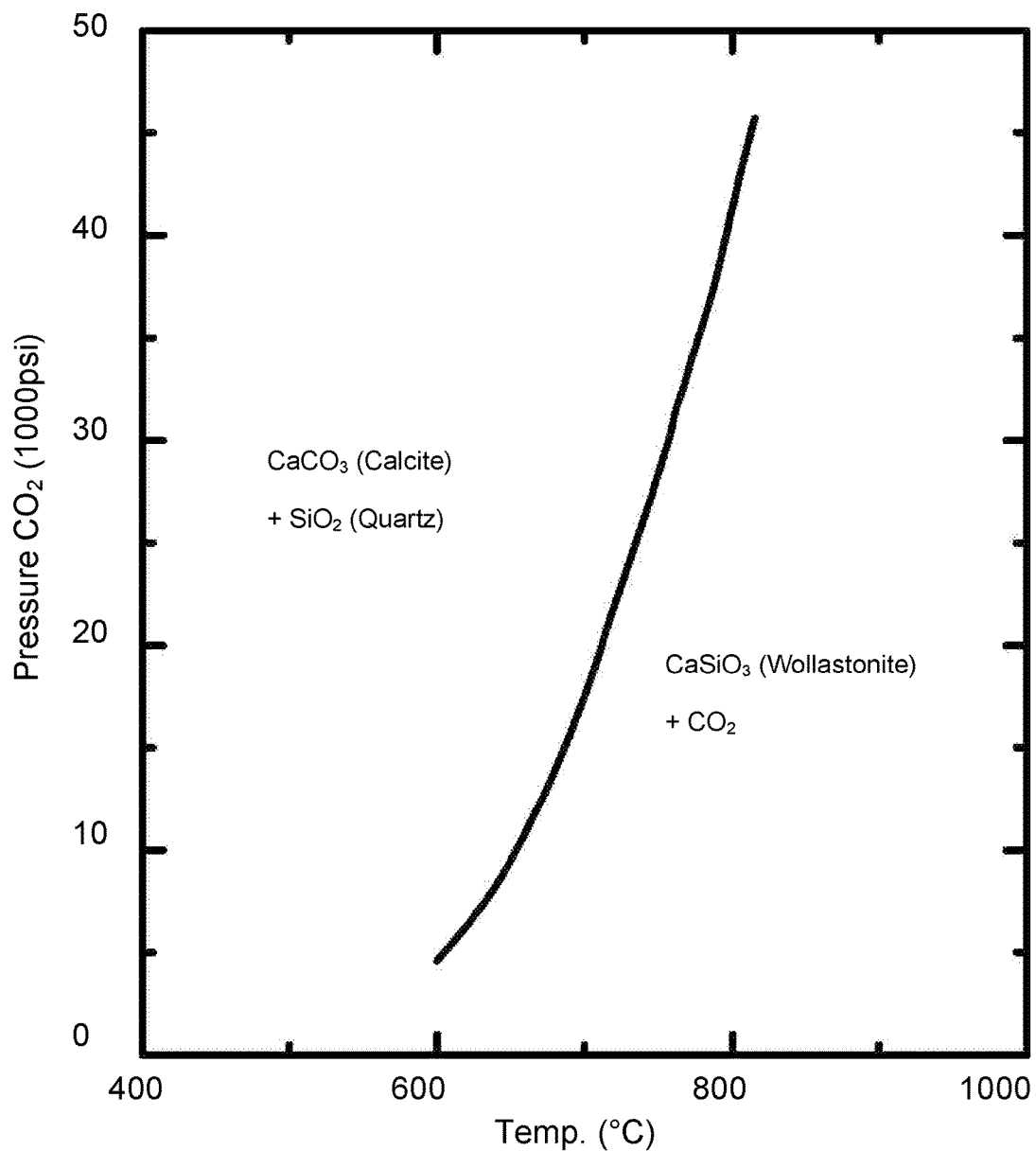
FIG. 1 is a pressure-temperature phase diagram showing the phases present in the reversible reaction $CaCO_3 + SiO_2 \leftrightarrow CaSiO_3$ (Wollastonite) $+ CO_2$.
Figure 2:
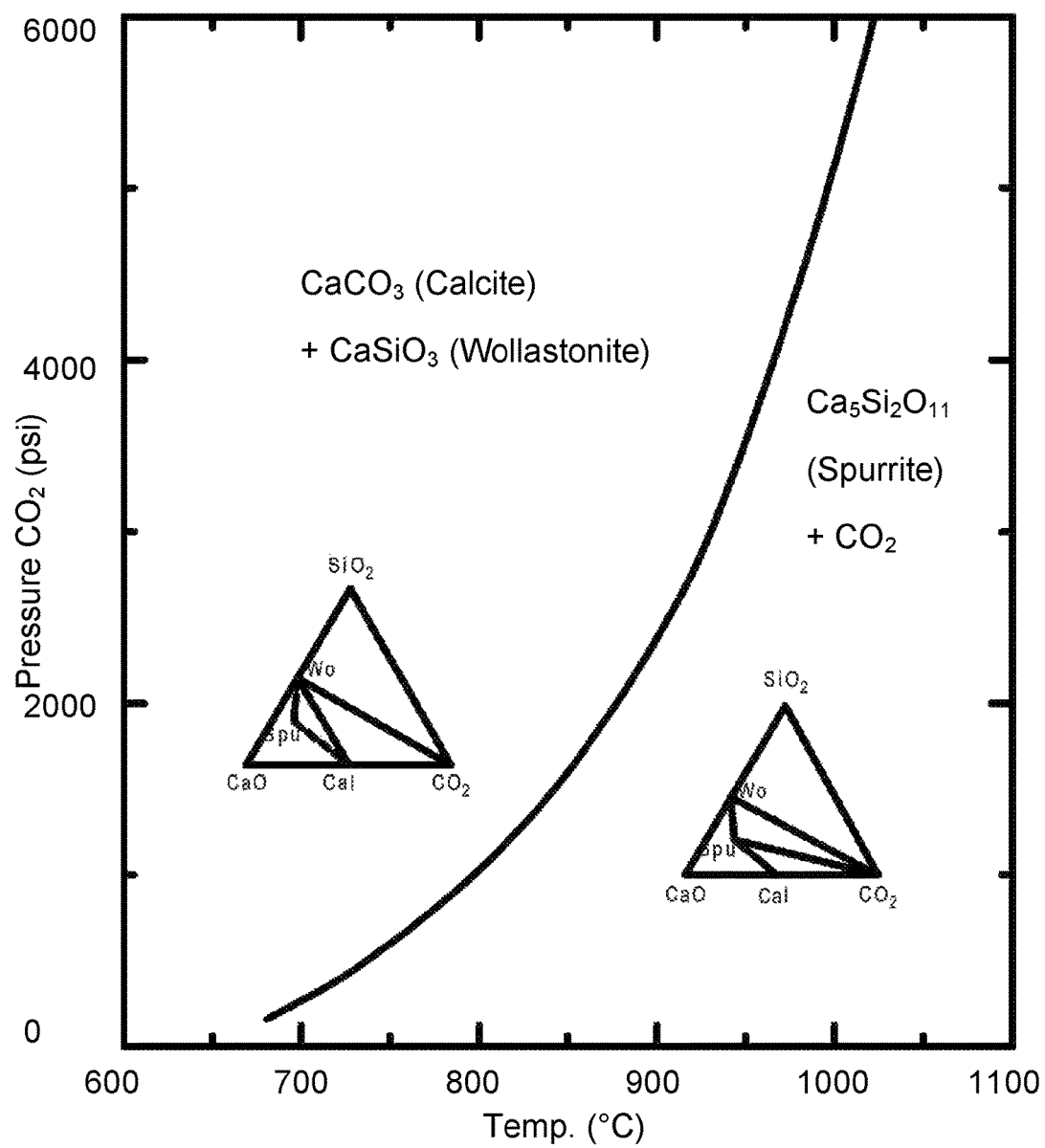
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
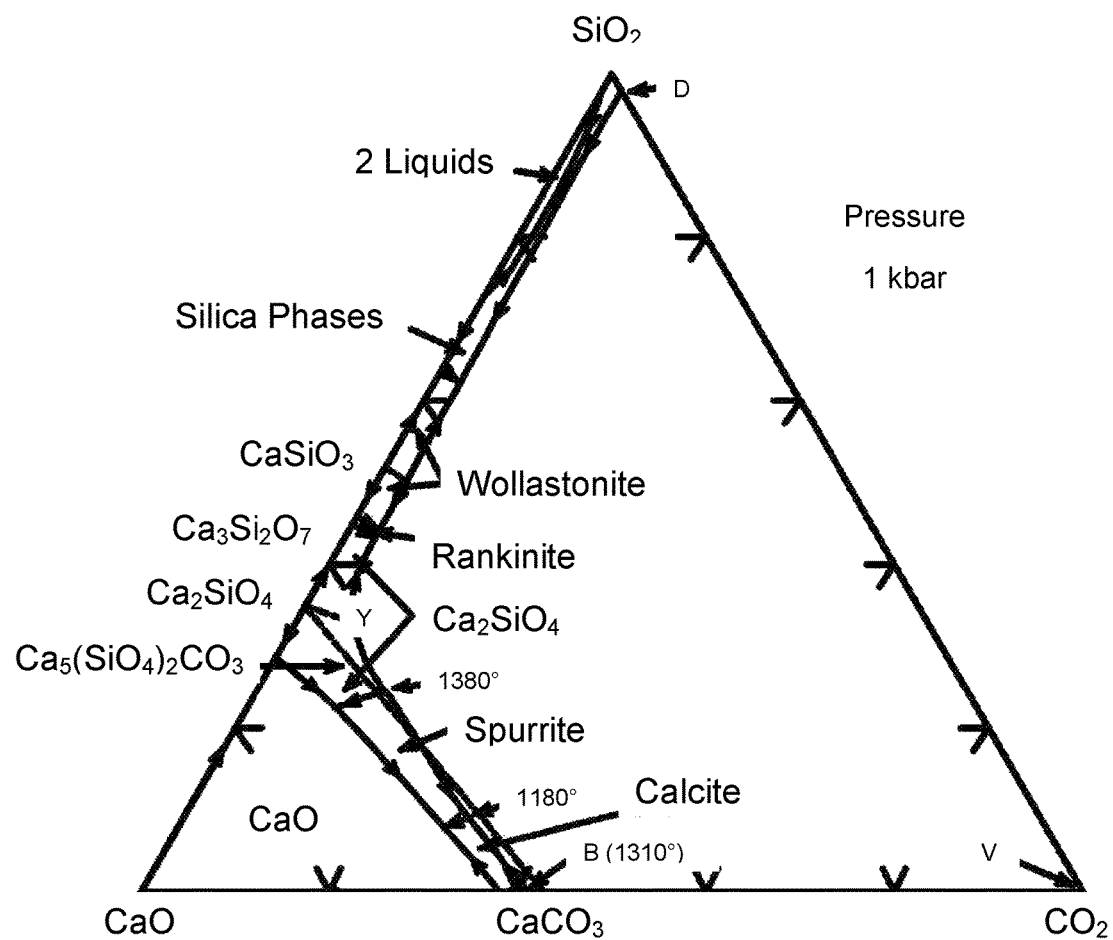
FIG. 3 is a phase diagram of the $CaO-SiO_2-CO_2$ system at a pressure of 1 kilobar.
Figure 4:
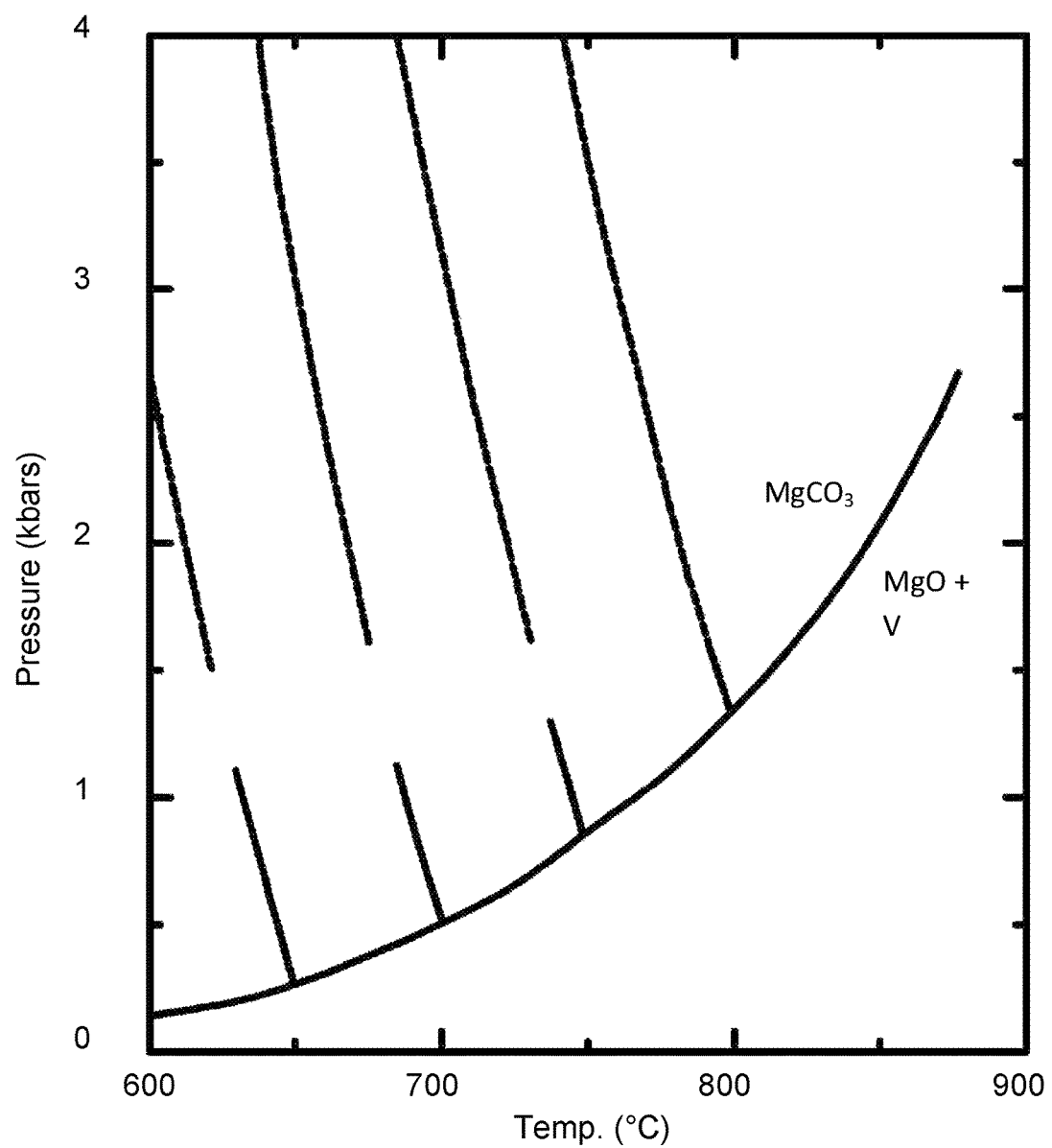
FIG. 4 is a pressure-temperature phase diagram showing the phases present in the reversible reaction $MgO + CO_2 \leftrightarrow MgCO_3$.
Figure 5:
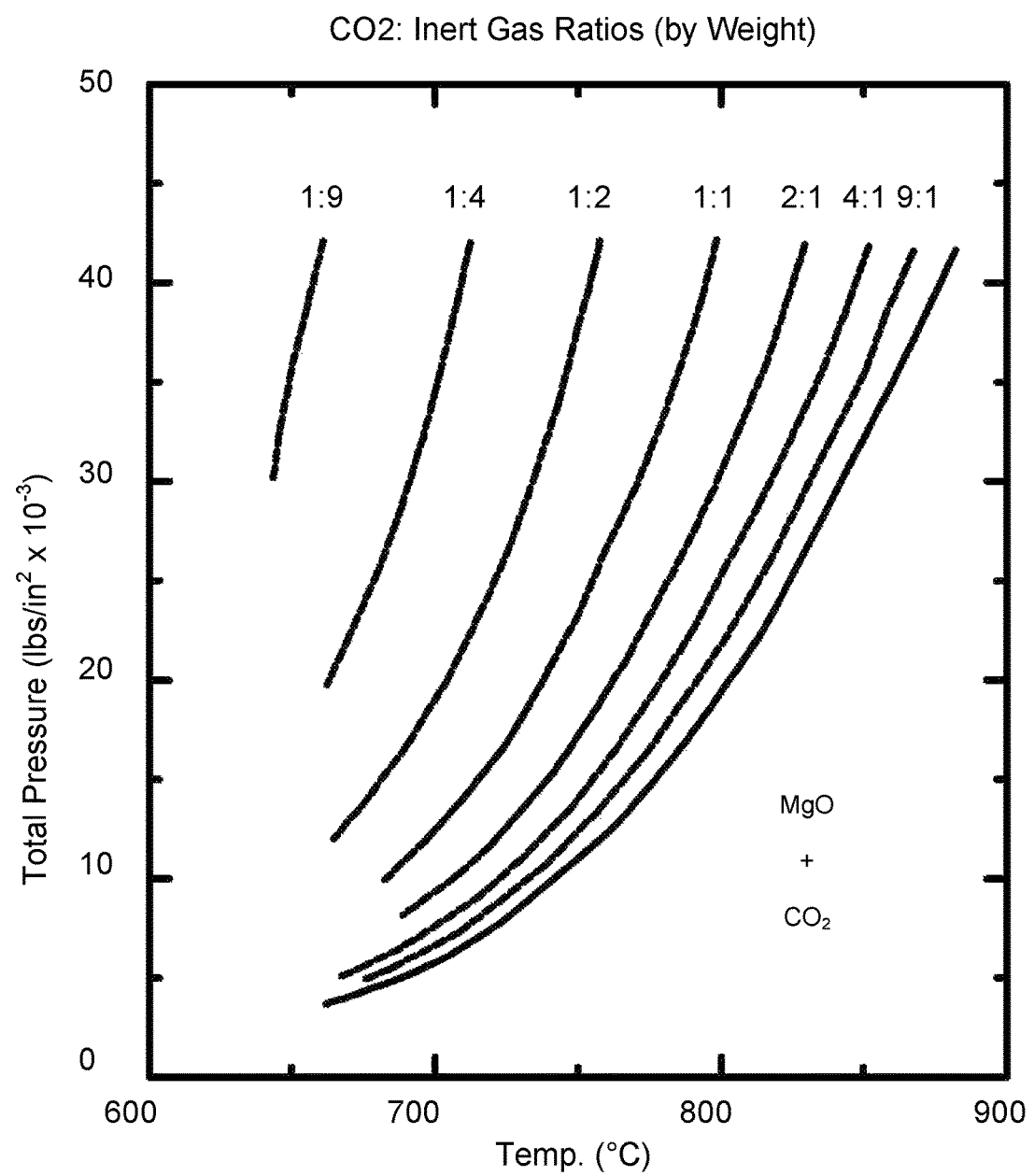
FIG. 5 is a pressure-temperature phase diagram showing the equilibrium curves for the reversible reaction $MgO + CO_2 \leftrightarrow MgCO_3$ as a function of the proportion of $CO_2$ in an inert gas.
Figure 6:
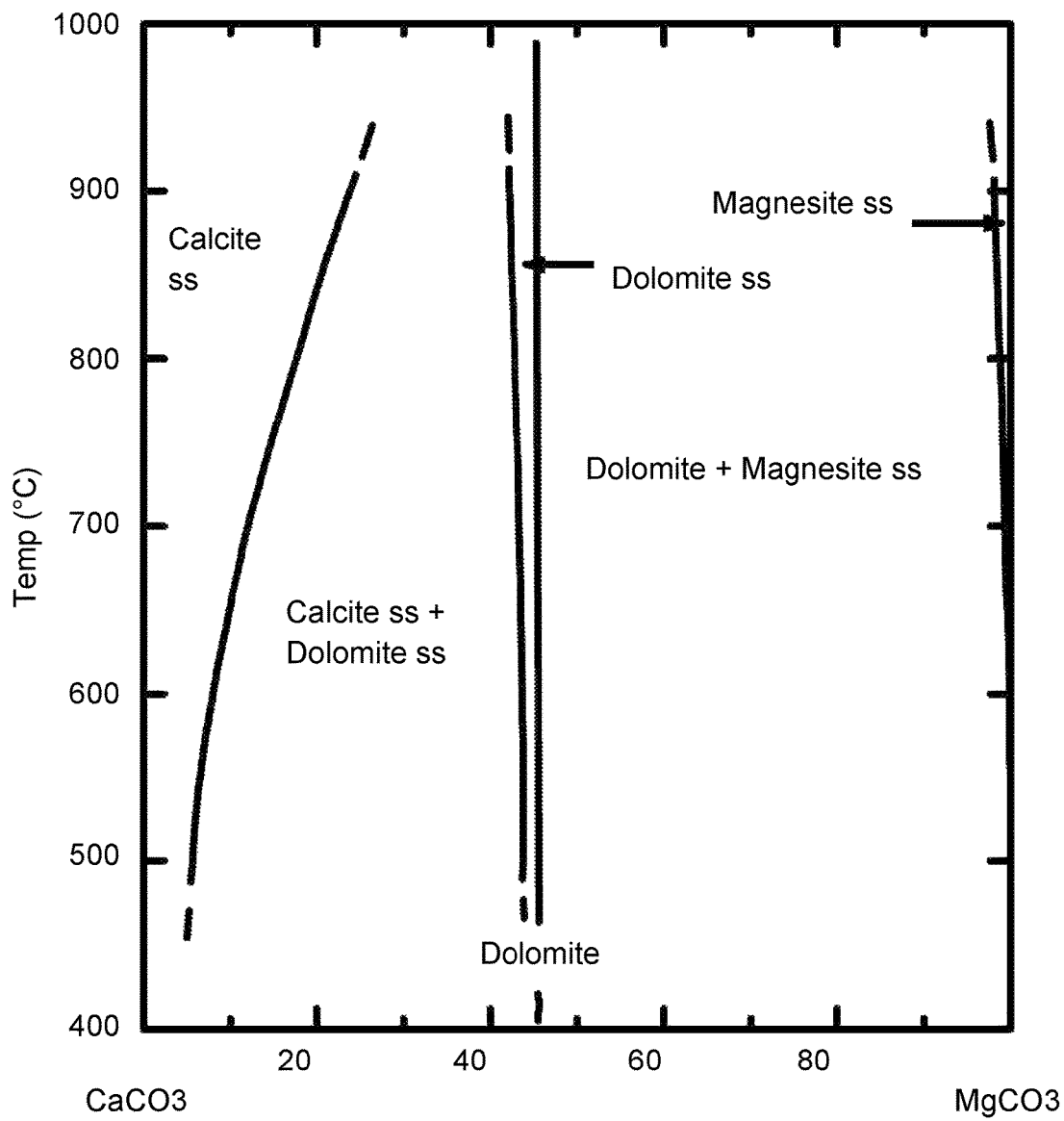
FIG. 6 is a temperature-composition phase diagram that illustrates the stability regions for various phases in the $CaCO_3-MgCO_3$ system.
Figure 7:
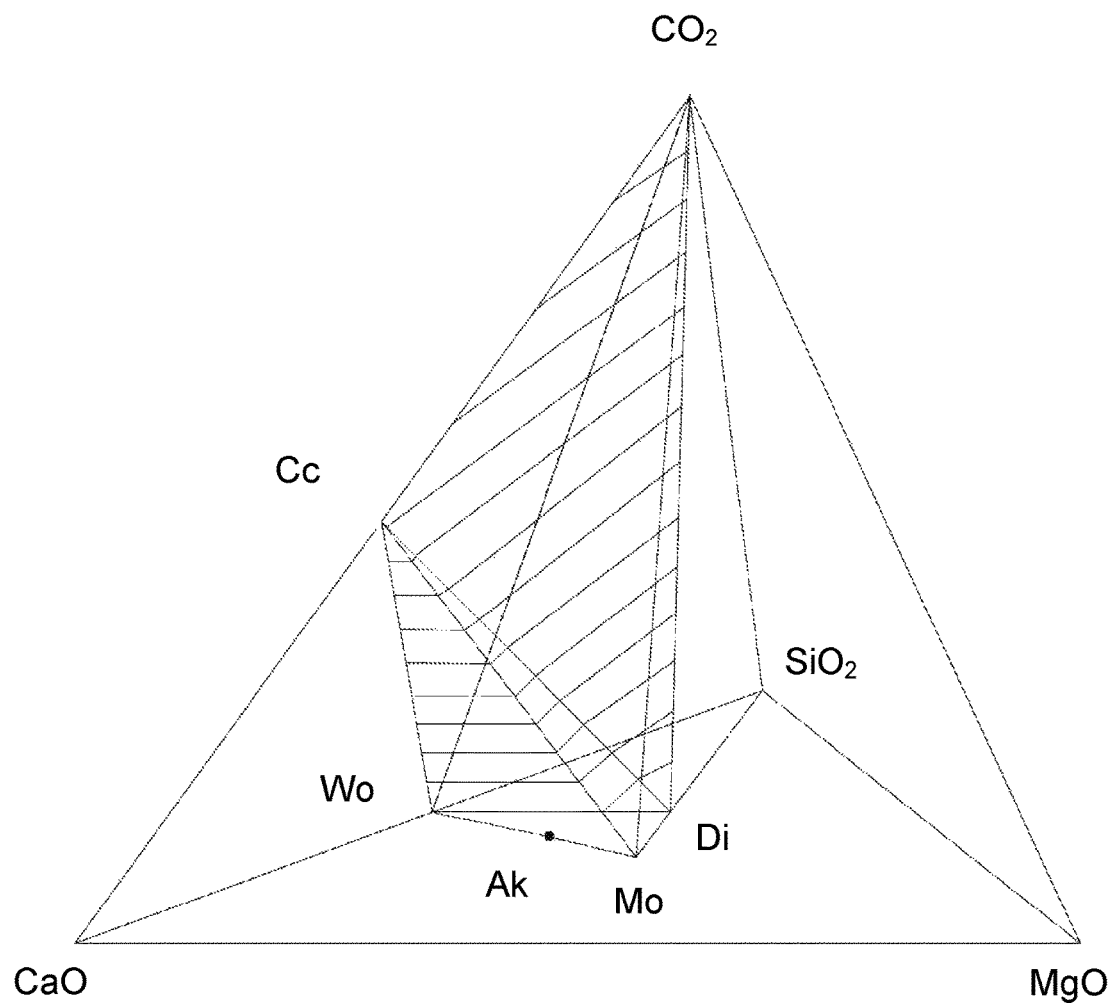
FIG. 7 is a tetrahedron diagram illustrating the phase relationships among the compounds CaO, MgO, $SiO_2$ and $CO_2$, and showing the $CO_2$ deficient region below the Cc-Di-Wo and the CC-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
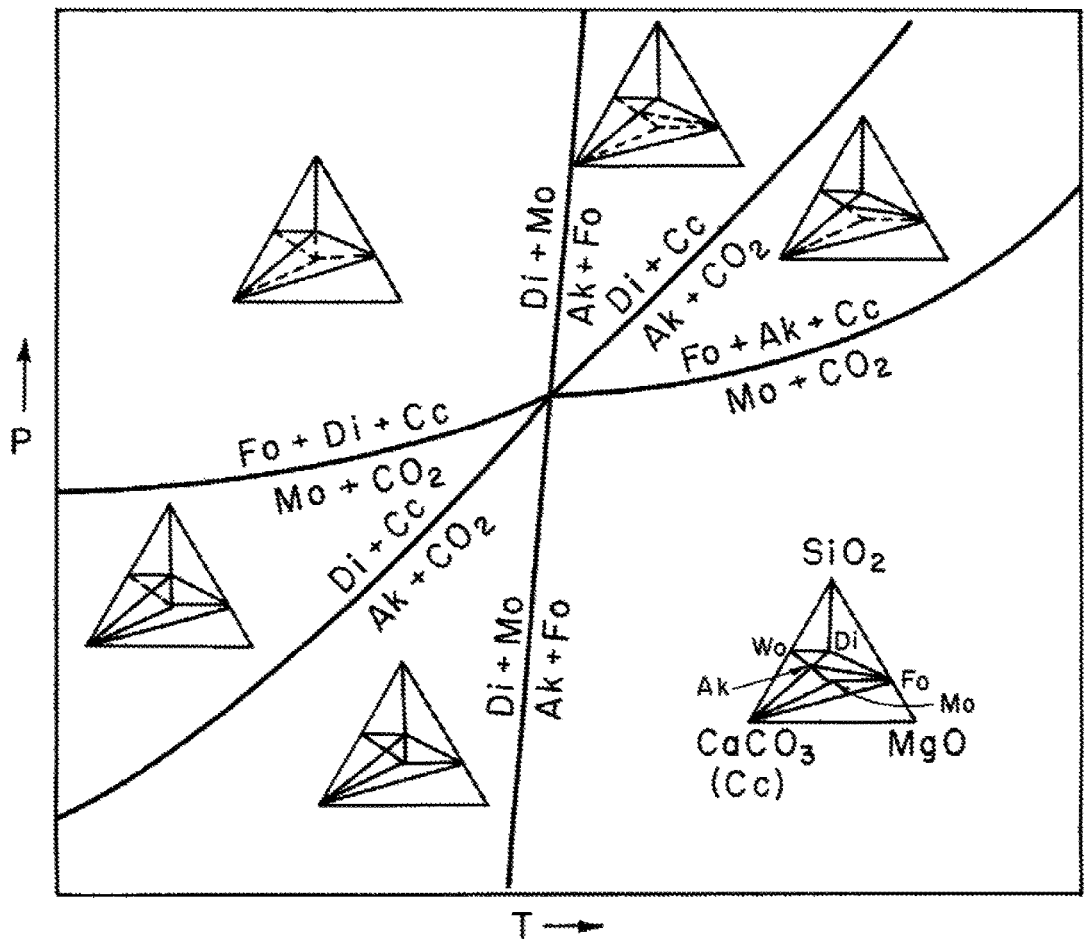
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound system $CaCO_3$, MgO, $SiO_2$.

The base activation of amorphous phases is an approach that is used in the cement industry today. However the amorphous phases are generally by-products such as flyash and slag. The problem with the by-products is their inconsistency in chemical composition, the abundance and availability (or lack of availability) of the starting materials, as well as geographical dependence.

The present disclosure describes a continuous and reliable supply of the amorphous phase material which would be synthesized in a cement plant with the existing raw materials.

We describe two different types of cement that set under activation with a chemical base.

One chemistry is based on gehlenite and the second one is based on anorthite.

In some embodiments, the starting materials to synthesize these two new chemistries are expected to be raw materials used in cement production such as limestone and shale, clay sand, and the like.

Gehlenite

To synthesize gehlenite ($Ca_2Al_2SiO_7$), also referred to as melilite, it is expected that one can adjust the calcium, silicon and aluminum content in the raw materials to an advantageous composition and fire them. One can do chemical analysis on the starting materials, which are expected to be by-products that would normally be considered to be waste materials. The starting compositions can be prepared taking into account the results of the chemical analysis. The chemical analysis can be performed in any convenient matter, such as wet chemistry, x-ray diffraction analysis, and EDAX. In some embodiments, it is expected that there will be some impurities such as iron, sodium, potassium, and other materials. This target chemistry will yield a reduction of ~40% in $CO_2$ emissions compared to ordinary Portland cement (OPC) produced in the most efficient kiln today.

It is expected that in some embodiments, the major phases that are produced will be crystalline gehlenite and amorphous calcium aluminum silicate. It is expected that in some embodiments, there will be minor phases (probably less than 7%) including one or more of residual silica, free lime, C2S (belite $Ca_2SiO_4$), CS (Wollastonite $CaSiO_3$), and C3S2 (rankinite $Ca_3Si_2O_7$).

Anorthite

To synthesize anorthite ($CaAl_2Si_2O_8$), it is expected that one can adjust the calcium, silicon and aluminum content in the raw materials to an advantageous composition and fire them. One can do chemical analysis on the starting materials, which are expected to be by-products that would normally be considered to be waste materials. The starting compositions can be prepared taking into account the results of the chemical analysis. The chemical analysis can be performed in any convenient matter, such as wet chemistry, x-ray diffraction analysis, and EDAX. In some embodiments, it is expected that there will be some impurities such as iron, sodium, potassium, and other materials. This target chemistry will yield a reduction of ~60% in $CO_2$ emissions compared to ordinary Portland cement (OPC) produced in the most efficient kiln today.

It is expected that in some embodiments, the major phases that are produced will be crystalline anorthite and amorphous calcium aluminum silicate. It is expected that in some embodiments, there will be minor phases (probably less than 7%) including one or more of residual silica, free lime, C2S (belite $Ca_2SiO_4$), CS (Wollastonite $CaSiO_3$), and C3S2 (rankinite $Ca_3Si_2O_7$).

Cement Compositions

It is intended that the material formed will be a mixture of crystalline phases and an amorphous phase. The more amorphous phase present, the better. However for rotary kiln operation it is expected that the amorphous phase may comprise 30%, 40% or 50% of the product. For other types of kilns in which the entire charge is melted, the amorphous phase may comprise even higher percentages, for example, 60%, 70% or 80% of the product.

In either the gehlenite or anorthite embodiments, the mixture of crystalline phases and an amorphous phase is then expected to be blended with activators as described hereinbelow.

The process of producing the cement includes one of the reactions described to produced gehlenite or anorthite plus the amorphous phase.

One then mills the material to provide particle sizes of the new cement mixtures that are similar to that of OPC or finer.

One then blends the new cement mixture with one of the following activators. In some embodiments, the blending can be done by co-grinding.

Activators

The activators can be one of the following materials: OPC (1-70 wt %), free lime (1-20 wt %), calcium hydroxide (1-20 wt %), and alkali hydroxides (NaOH, KOH 1 to 10 wt %), individually or in combination. In general the activator may be an activator selected from the group of materials comprising inorganic and organic bases.

One then causes the activator to react with the amorphous phases in the cement mixture. The reaction between the amorphous phase and the activators is not known in the literature.

The activators are expected to react with the amorphous phase resulting in a cementitious product.

Chemical Discussion

This invention provides apparatus and methods used to manufacture novel composite materials that are cured predominantly by a $CO_2$ consumption reaction. The materials exhibit useful properties and can be readily produced from widely available, low cost precursor materials by a process suitable for large-scale production with minimal environmental impact. The precursor materials include inexpensive and abundant calcium silicate rich materials, fine particles and coarse particles. The calcium silicate rich materials may be comprised of ground Wollastonite. The fine and coarse particles may be comprised of ground limestone or other calcium carbonate based materials, ground quartz or other $SiO_2$ based materials, sand and crushed rock. The fine and coarse particles may also be comprised of crushed minerals such as granite, mica and feldspar. Other process components include water and $CO_2$. Various additives can be used to modify and fine-tune the physical appearance and/or mechanical properties of the resulting composite material, such as additives selected from one or more of pigments (e.g., black iron oxide, cobalt oxide and chromium oxide), colored glass and/or colored quartz. Additives regarding water usage reduction and changes in rheology can also be used.

The composite materials can be produced, as disclosed herein, using the energy-efficient Hydrothermal Liquid Phase Sintering (HLPS) process to create bonding elements which hold together the various components of the composite material. The composite materials can be manufactured at low cost and with favorable environmental impact. For example in preferred embodiments of the invention, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS can be found in U.S. Pat. No. 8,114,367, U.S. Pub. No. US 2009/0143211 (appl. Ser. No. 12/271,566), U.S. Pub. No. US 2011/0104469 (appl. Ser. No. 12/984,299), U.S. Pub. No. 20090142578 (appl. Ser. No. 12/271,513), WO 2009/102360 (PCT/US2008/083606), WO 2011/053598 (PCT/US2010/054146), WO 2011/090967 (PCT/US2011/021623), U.S. application Ser. No. 13/411,218 filed Mar. 2, 2012 (Riman et al.), U.S. application Ser. No. 13/491,098 filed Jun. 7, 2012 (Riman et al), U.S. Provisional Patent Application No. 61/708,423 filed Oct. 1, 2012, and U.S. Provisional Patent Application Nos. 61/709,435, 61/709,453, 61/709,461, and 61/709,476, all filed Oct. 4, 2012, each of which is expressly incorporated herein by reference in its entirety for all purposes.

As used herein, the term "calcium silicate" refers to naturally-occurring minerals or synthetic materials that are comprised of one or more of a group of calcium-silicon-containing compounds including $CaSiO_3$ (also known as "Wollastonite" or "pseudo-wollastonite" and sometimes formulated as $CaO.SiO_2$), $Ca_3Si_2O_7$ (also known as "Rankinite" and sometimes formulated as $3CaO.2SiO_2$), $Ca_2SiO_4$ (also known as "Belite" and sometimes formulated as $2CaO.SiO_2$), $Ca_3SiO_5$ (also known as "Alite" and sometimes formulated as $3CaO.SiO_2$), and $Ca_5(SiO_4)_2CO_3$ (also known as "Spurrite" and sometimes formulated as $2Ca_2SiO_4.CaCO_3$), each of which materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. FIG. 1 through FIG. 8 are phase diagrams that show various phase interrelationships among some of the materials described.

It should be understood that, compositions and methods disclosed herein can be adopted to use magnesium silicate in place of or in addition to calcium silicate. As used herein, the term "magnesium silicate" refers to nationally-occurring minerals or synthetic materials that are comprised of one or more of a groups of magnesium-silicon-containing compounds including, for example, $Mg_2SiO_4$ (also known as "Fosterite"), $Mg_3Si_4O_{10}(OH)_2$) (also known as "Talc"), and $CaMgSiO_4$ (also known as "Monticellite"), each of which materials may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

In certain preferred embodiments, the plurality of bonding elements are prepared by chemical transformation from ground Wollastonite (or a non-Wollastonite precursor calcium silicate or magnesium silicate) by reacting it with $CO_2$ via a gas-assisted HLPS process.

In certain embodiments, the composite material is characterized by a compressive strength from about 90 MPa to about 175 MPa (e.g., about 90 MPa to about 150 MPa, about 90 MPa to about 140 MPa, about 90 MPa to about 130 MPa, about 90 MPa to about 120 MPa, about 90 MPa to about 110 MPa, about 100 MPa to about 175 MPa, about 120 MPa to about 175 MPa, about 130 MPa to about 175 MPa, about 140 MPa to about 175 MPa, about 150 MPa to about 175 MPa, about 160 MPa to about 175 MPa).

In certain embodiments, the composite material is characterized by a flexural strength from about 5 MPa to about 30 MPa (e.g., about 5 MPa to about 25 MPa, about 5 MPa to about 20 MPa, about 5 MPa to about 15 MPa, about 5 MPa to about 10 MPa, about 10 MPa to about 30 MPa, about 20 MPa to about 30 MPa, about 25 MPa to about 30 MPa).

In certain embodiments, the composite material is characterized by water absorption of less than about 10% (e.g., less than about 8%, 5%, 4%, 3%, 2%, or 1%).

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

Equipment and Processing Discussion

Figure 9:
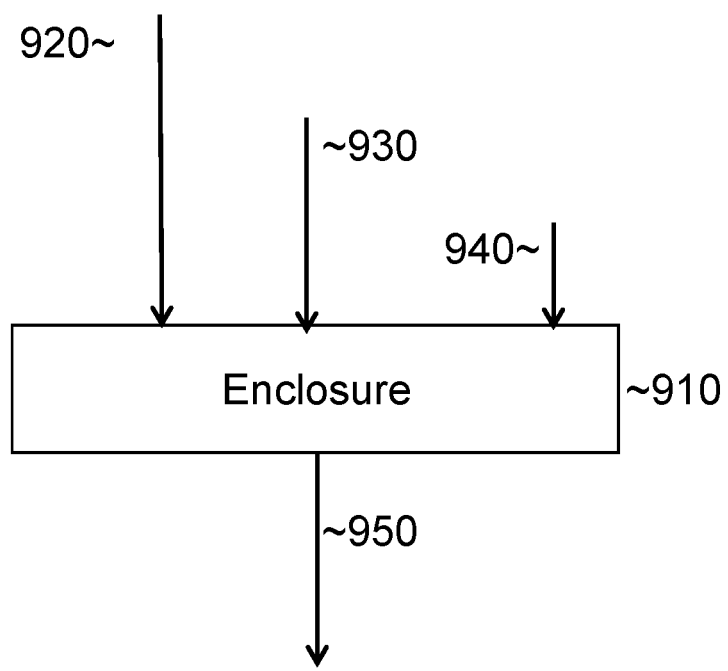
FIG. 9 is a schematic diagram of a simple processing enclosure that allows the control of one or more of the $CO_2$ concentration, the humidity and the temperature that a material that is processed using the HLPS technology described herein.

FIG. 9 is a schematic diagram of a simple processing enclosure that allows the control of one or more of the $CO_2$ concentration, the humidity and the temperature that a material that is processed using the HLPS technology described herein. In the apparatus of FIG. 9, an enclosure 910 is provided, in which the material to be processed is enclosed. The enclosure can be a simple covering, as with a tarpaulin or plastic sheeting, or it can be a frame covered with simple walls and a roof. The enclosure is fed with a source of $CO_2$ 920, a source of water vapor 930 and a thermal energy source 940 so that the material to be processed is provided with an environment having a predefined concentration of $CO_2$, a predefined humidity and a predefined temperature. In such a simple system, the predefined values are provided using an "open loop" control method, in which a "recipe" is followed, and in which measurements to check on the actual values of $CO_2$ concentration, humidity and temperature during the course of the curing process are rarely performed, or are not performed at all. Such a curing approach is useful when a "known good recipe" is available, for example one used repeatedly and known to provide adequate curing for a specific product. An example where such a curing method is useful is in the curing of large volume, low cost products that do not have to conform to a very tight standard, but simply have to be adequately cured so as to exceed a predefined standard of quality. In such a system, one can check the adequacy of the curing by removing a small number of samples of the product and testing them to see if they are properly cured, and terminating the curing when the samples meet the predefined standard.

$CO_2$ Control

In the embodiments described, industrial grade $CO_2$ at about 99% purity is used, which is provided by a variety of different industrial gas companies, such as Praxair, Inc., Linde A G, Air Liquide, and others. This supply can be held in large pressurized holding tanks in the form of liquid carbon dioxide regulated at a temperature such that it maintains a vapor pressure of approximately 300 PSIG. This gas is then piped to a $CO_2$ curing enclosure or chamber. In the simplest system, $CO_2$ is flowed through the enclosure at a rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so s to maintain a concentration of $CO_2$ sufficient to drive the curing reaction.

As an example, we now describe a method for sustaining carbon dioxide concentrations during the reaction that is well suited for keeping a highly consistent concentration, although it is a "closed loop" process which tends to be the most expensive technique. This method uses the measurement of $CO_2$ concentration in the system directly, and employs a controller such as a PLC to control the $CO_2$ concentration at a set point with an electronic/automated control valve. A measurement technique to measure $CO_2$ directly such as NDIR should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, using a dry bulb-wet bulb humidity measurement device or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of composite material specimens.

Humidity Control

Figure 10:
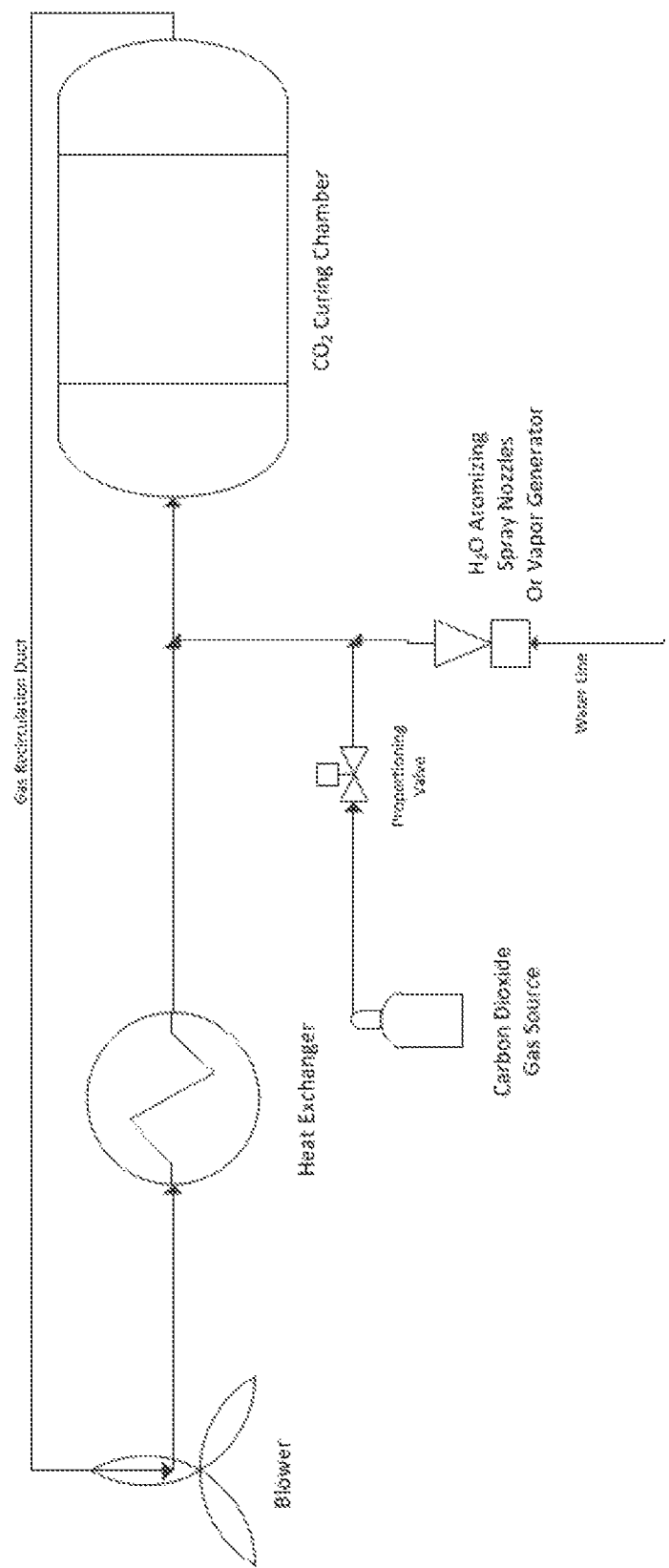
FIG. 10 is a schematic diagram of a $CO_2$ composite material curing chamber that provides humidification according to principles of the invention.

FIG. 10 is a schematic diagram of a $CO_2$ composite material curing chamber that provides humidification according to principles of the invention. In FIG. 10, a water supply is provided and water vapor is added to the atmosphere that is circulating within the curing chamber. The water can be any convenient source of potable water. In some embodiments, ordinary tap water is used. In some embodiments, the water can be converted to vapor by flowing through a misting nozzle or an atomizing spray nozzle, an electric vapor generator, a gas fired vapor generator, or by being heated above the gas temperature in the chamber so as to cause evaporation from a liquid water supply an example being a drum reactor with an immersion heater. In yet another embodiment, the $CO_2$ supply can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in $CO_2$ composite material curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the $CO_2$ composite material curing systems described herein.

Depending on the type and geometry of the product being cured, the design of the chamber, and the packing efficiency of product in the chamber the humidity may need to be either decreased or increased and regulated to a specified set point. Set points may range anywhere from 1% to 99% relative humidity. Three different methods for humidity control may exist in $CO_2$ composite material curing processes that could be combined into a single system. One method for humidification in one embodiment of a $CO_2$ curing system is represented in FIG. 10. Another method allows one to remove moisture from the system to cure the composite material products with $CO_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 11:
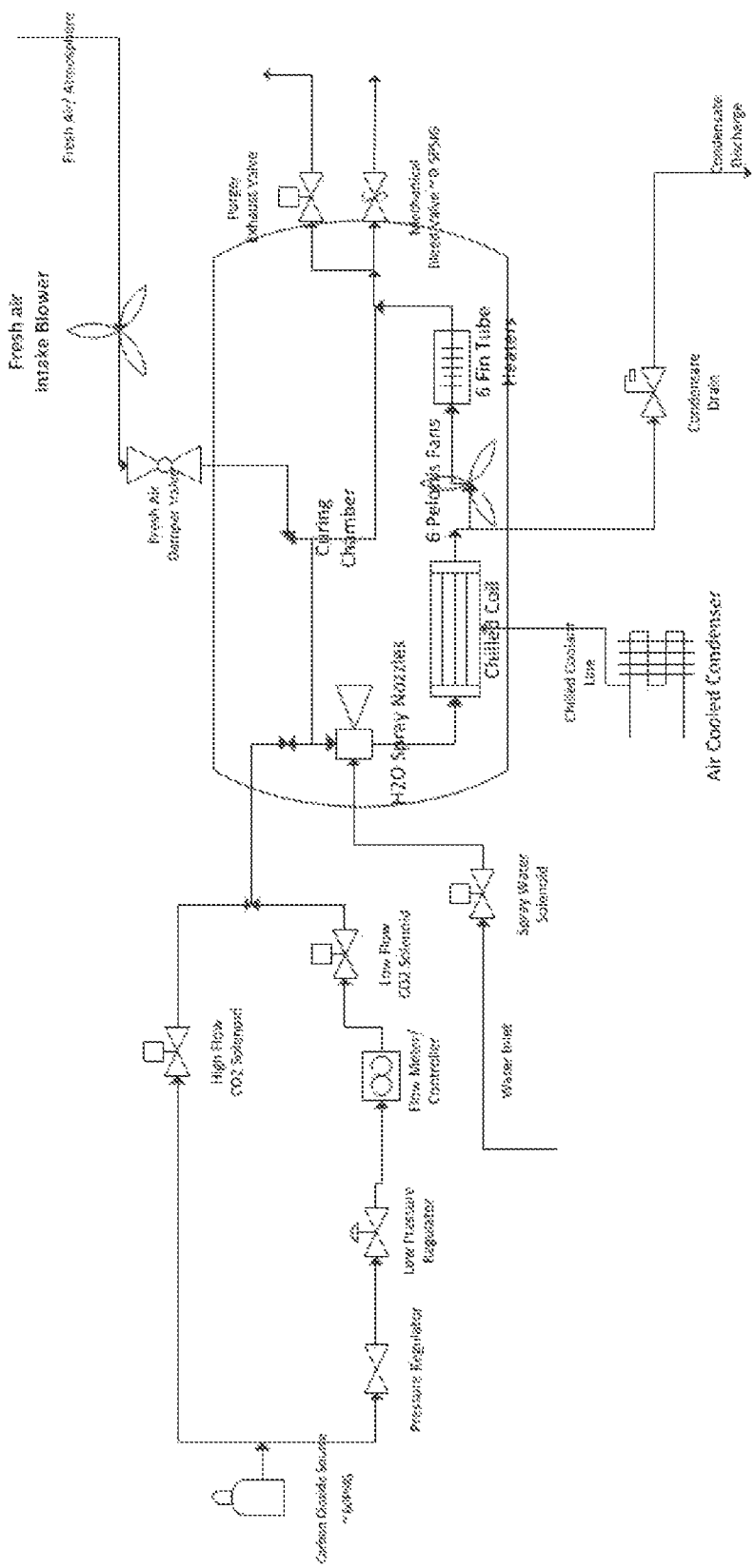
FIG. 11 is a schematic diagram of a curing chamber with multiple methods of humidity control as well as ability to control and replenish $CO_2$ using constant flow or pressure regulation and that can control the temperature according to principles of the invention.

FIG. 11 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Temperature Control

In some embodiments, temperature is measured utilizing a sensor such as a thermocouple or an RTD. The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

Gas Flow Control

Another control parameter is gas velocity across the material that is to be cured in the system. The gas velocity can be very dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

We describe a process for preparing a composite material. The process includes: mixing a particulate composition and a liquid composition to create a slurry mixture; forming the slurry mixture into a desired shape, either by casting the slurry into a mold, pressing the slurry in a mold, pressing the slurry in a vibrating mold, extruding the slurry, slip forming the slurry, or using any other shape-forming method common in concrete production, and curing the formed slurry mixture at a temperature in the range from about 20° C. to about 150° C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material exhibiting a texture and/or a pattern and the desired physical properties related to compressive strength, flexural strength, density, resistance to degradation, and so forth.

The particulate composition includes a ground calcium silicate having a median particle size in the range from about 1 µm to about 100 µm. In addition the particulate composition may include a ground calcium carbonate or a $SiO_2$ bearing material having a median particle size in the range from about 3 μm to about 25 mm. The liquid composition includes water and may include a water-soluble dispersant.

The process can further include, before curing the casted mixture, the step of drying the casted mixture. The particulate composition further comprises a pigment or a colorant as discussed herein.

In certain embodiments, curing the formed slurry mixture is performed at a temperature in the range from about 30° C. to about 120° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 60° C. to about 110° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 80° C. to about 100° C. for about 1 hour to about 60 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature equal to or lower than about 60° C. for about 1 hour to about 50 hours under a vapor comprising water and $CO_2$ and having an ambient atmospheric pressure.

For example, in some embodiments, the ground calcium silicate has a median particle size from about 1 μm to about 100 μm (e.g., about 1 μm, 5 μm, 10 μm, 15 μm, 20 μm, 25 μm, 30 μm, 40 μm, 90 μm), a bulk density from about 0.6 g/mL to about 0.8 g/mL (loose) and about 1.0 g/mL to about 1.2 g/mL (tapped), a surface area from about 1.5 m$^2$/g to about 2.0 m$^2$/g.

In certain preferred embodiments, the liquid composition includes water and a water-soluble dispersant comprising a polymer salt (e.g., an acrylic homopolymer salt) having a concentration from about 0.1% to about 2% w/w of the liquid composition.

Composite materials prepared according to a process disclosed herein can exhibit a compressive strength from about 90 MPa to about 175 MPa and a flexural strength from about 5.4 MPa to about 20.6 MPa.

We also describe one or more articles of manufacture made from a composite material.

Any suitable precursor materials may be employed. For example calcium silicate particles formed primarily of Wollastonite, $CaSiO_3$, can react with carbon dioxide dissolved in water. It is believed that calcium cations are leached from the Wollastonite and transform the peripheral portion of the Wollastonite core into calcium-deficient Wollastonite. As the calcium cations continue to be leached from the peripheral portion of the core, the structure of the peripheral portion eventually become unstable and breaks down, thereby transforming the calcium-deficient Wollastonite peripheral portion of the core into a predominantly silica-rich first layer. Meanwhile, a predominantly calcium carbonate second layer precipitates from the water.

More specifically, the first layer and second layer may be formed from the precursor particle according the following reaction (1) which can use water as a reaction medium, and not as a reagent (that is, the water is not consumed):

$$CaSiO_3(s)+CO_2(g) \rightarrow CaCO_3(s)+SiO_2(s) \quad \Delta H° = -87 kJ/mol\ CO_2 \quad (1)$$

For example, in a silicate mineral carbonation reaction such as with Wollastonite, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from $CaSiO_3$. The released calcium cations and the dissociated carbonate species lead to the precipitation of insoluble carbonates. Silica-rich layers are thought to remain on the mineral particles as calcium depleted layers.

Thus, according to a preferred embodiment of the invention, $CO_2$ preferentially reacts with the calcium cations of the Wollastonite precursor core, thereby transforming the peripheral portion of the precursor core into a silica-rich first layer and a calcium carbonate-rich second layer. Also, the presence of the first and second layers on the core act as a barrier to further reaction between Wollastonite and carbon dioxide, resulting in the bonding element having the core, first layer and second layer.

In some embodiments, silicate materials having metals other than Ca or in addition to Ca, for example Fosterite ($Mg_2SiO_4$), Diopside ($CaMgSi_2O_6$), and Talc ($Mg_3Si_4O_{10}(OH)_2$) can react with carbon dioxide dissolved in water in a manner similar to the reaction of Wollastonite, as described above. It is believed that such silicate materials can be used, alone, in combination, and/or in combination with Wollastonite, as precursors for bonding elements according to principles of the invention.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor: D. R. Lide, Chapters 6 and 8, 87$^{th}$ Edition 2006-2007, CRC.) This partially infiltrated state enables the reaction to proceed to a high degree of carbonation in a fixed period of time.

Liquid water in the pores speeds up the reaction rate because it provides a medium for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is present in the precursor material (e.g., as residual water from prior mixing step) and liquid water is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a second exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a third exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is performed at about 25 to 90° C. and 0 psig (at ambient atmospheric pressure) for about 2 to 72 hours.

In the above embodiments, the time required for curing of a composite material object is determined by the ability of water vapor and $CO_2$ gas to diffuse throughout the object. In general, thicker objects take longer to cure than thinner objects. Similarly, objects with high density (and fewer open pore spaces) take longer to cure than objects with low density (and more open pore spaces). The following table provides examples of how the curing times may vary with respect to the smallest thickness (or wall thickness or section thickness) of the three dimensions and the bulk density of an object that is being manufactured.

| Composite Material Smallest Thickness (mm) | Composite Material Bulk Density (gm/cm³) | Approximate Curing Time (h) |
| --- | --- | --- |
| 10 | 2.4 | 2 |
| 25 | 1.6-2.3 | 8-12 |
| 75 | 2.1-2.3 | 16 |
| 100 | 0.4-0.8 | 8-12 |
| 200 | 1.5 | 72 |
| 200 | 2.4 | 72 |

Discussion of Manufactured Microstructures

Figure 12A:
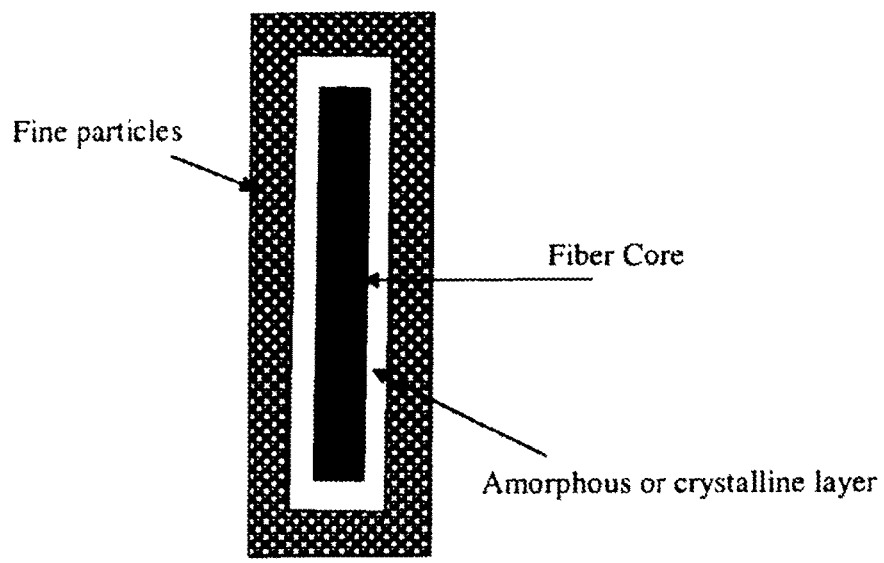
FIG. 12A is a schematic illustration of cross-section a fibrous core morphology of bonding elements according to exemplary embodiments of the present invention.
Figure 12B:
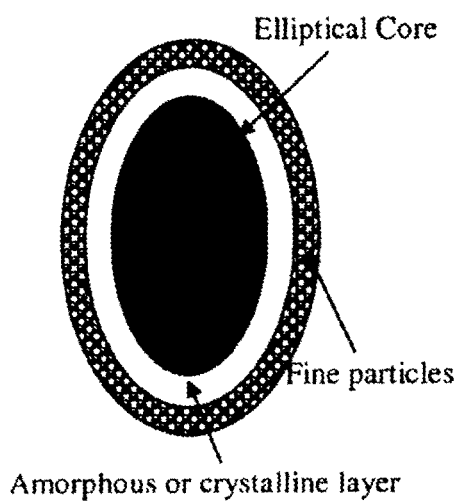
FIG. 12B is a schematic illustration of cross-section an elliptical core morphology of bonding elements according to exemplary embodiments of the present invention.
Figure 12C:
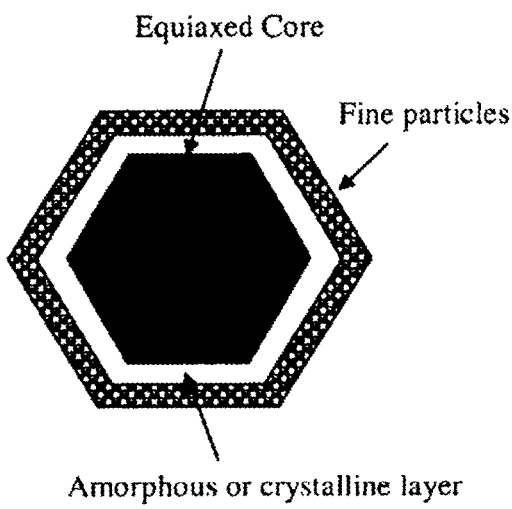
FIG. 12C is a schematic illustration of cross-section an equiaxed core morphology of bonding elements according to exemplary embodiments of the present invention.

As schematically illustrated in FIGS. 12A-12C, a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Figure 13A:
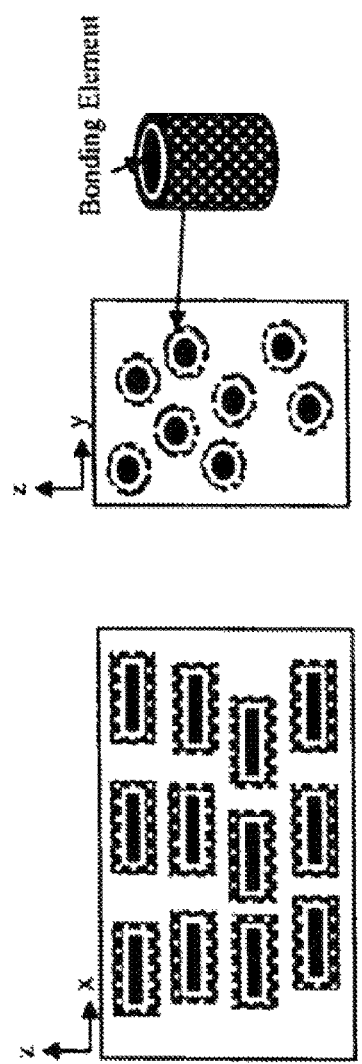
FIG. 13A through FIG. 13F are schematic illustrations of side view and cross section views of composite materials according to exemplary embodiments of the present invention.
Figure 13B:
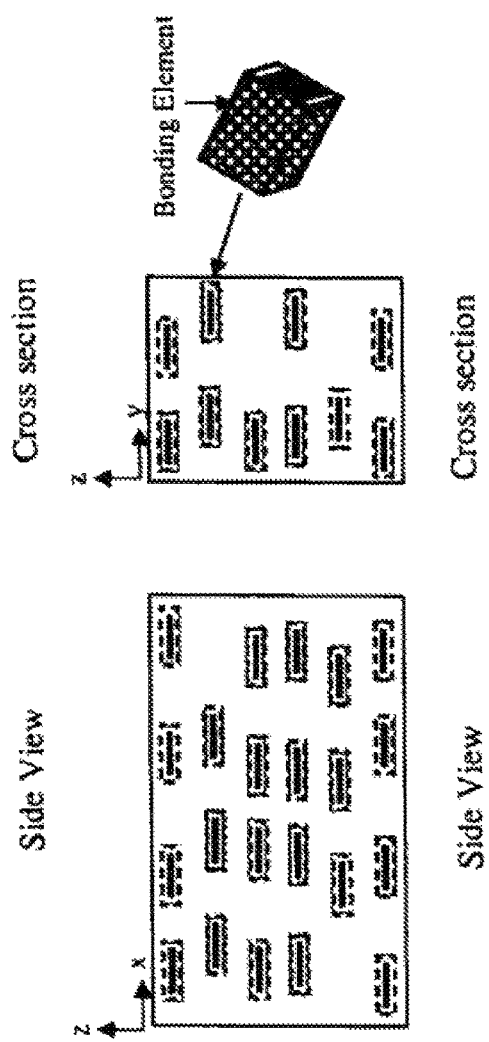
Figure 13C:
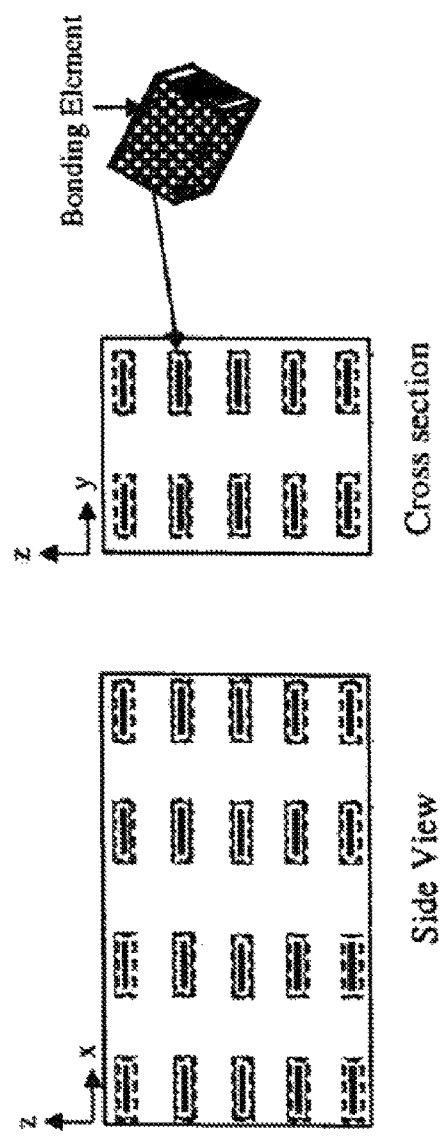
Figure 13D:
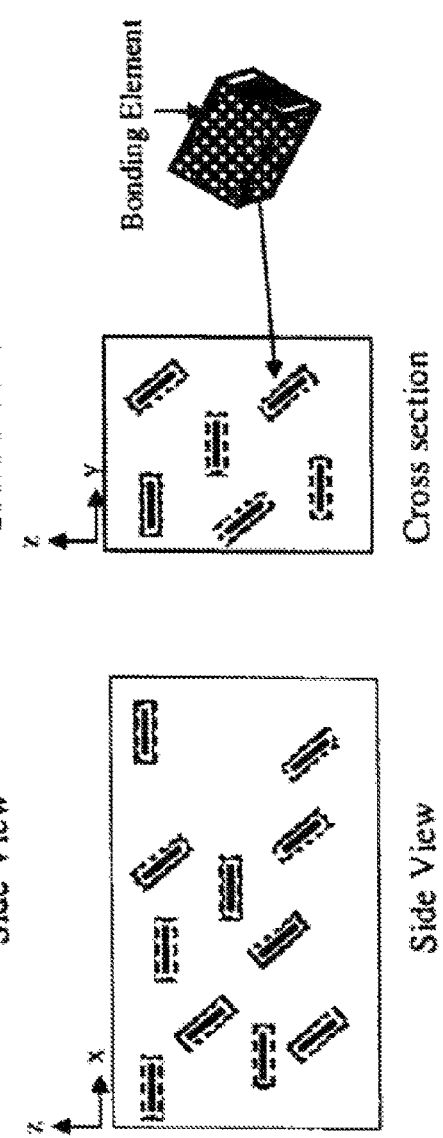
Figure 13E:
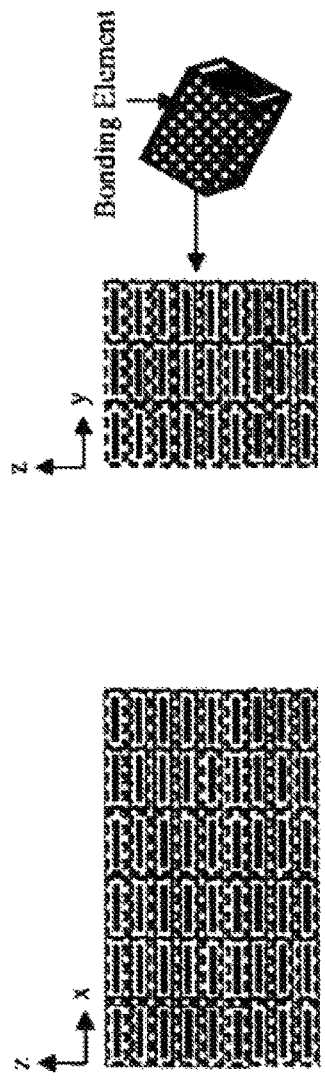
Figure 13F:
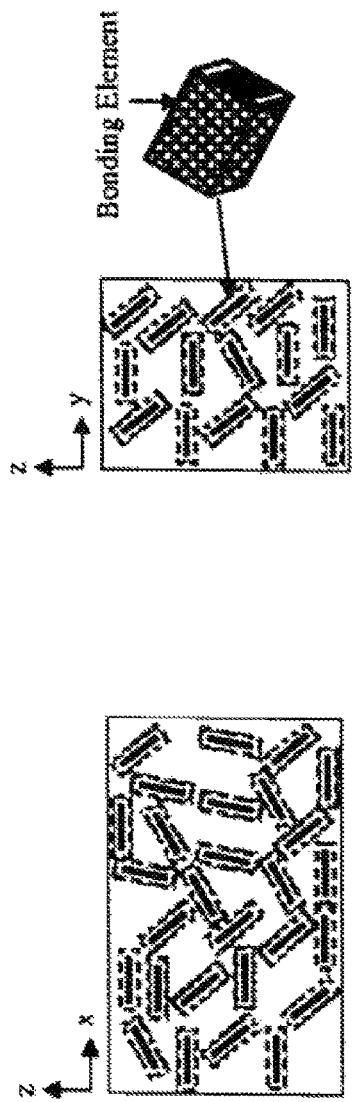

Within the bonding matrix, the bonding elements may be positioned, relative to each other, in any one of a number of orientations. FIGS. 13A-13F schematically illustrate an exemplary bonding matrix that includes fiber- or platelet-shaped bonding elements in different orientations possibly diluted by the incorporation of filler material, as represented by the spacing between the bonding elements. FIG. 13A, for example, illustrates a bonding matrix that includes fiber-shaped bonding elements aligned in a one-direction ("1-D") orientation (e.g., aligned with respect to the x direction). FIG. 13B illustrates a bonding matrix that includes platelet-shaped bonding elements aligned in a two-direction ("2-D") orientation (e.g., aligned with respect to the x and y directions). FIG. 13C illustrates a bonding matrix that includes platelet-shaped bonding elements aligned in a three-direction ("3-D") orientation (e.g., aligned with respect to the x, y and z directions). FIG. 13D illustrates a bonding matrix that includes platelet-shaped bonding elements in a random orientation, wherein the bonding elements are not aligned with respect to any particular direction. FIG. 13E illustrates a bonding matrix that includes a relatively high concentration of platelet-shaped bonding elements that are aligned in a 3-D orientation. FIG. 13F illustrates a bonding matrix that includes a relatively low concentration of platelet-shaped bonding elements that are situated in a random orientation (a percolation network). The composite material of FIG. 13F achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 13E, or random orientation, e.g., FIG. 13F, of bonding elements. Examples of connectivity patterns can be found in, for example, Newnham, et al., "Connectivity and piezoelectric-pyroelectric composites", *Mat. Res. Bull.* vol. 13, pp. 525-536, 1978).

The plurality of bonding elements may be chemically transformed from any suitable precursor materials, for example, from a precursor calcium silicate other than Wollastonite. The precursor calcium silicate may include one or more chemical elements of aluminum, magnesium and iron.

The plurality of bonding elements may have any suitable median particle size and size distribution dependent on the desired composite material. In certain embodiments, the plurality of bonding elements have a median particle size in the range of about 5 μm to about 100 μm (e.g., about 5 μm to about 80 μm, about 5 μm to about 60 μm, about 5 μm to about 50 μm, about 5 μm to about 40 μm, about 5 μm to about 30 μm, about 5 μm to about 20 μm, about 5 μm to about 10 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

In some instances a composite material includes: a plurality of bonding elements and a plurality of filler particles. Each bonding element includes: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together, whereby the composite material exhibits one or more textures, patterns and physical properties. In some instances, the bonding elements may have a core of magnesium silicate, and a silica-rich first or inner layer, and a magnesium carbonate-rich second or outer layer. The magnesium silicate can include aluminum, calcium, iron or manganese oxides.

The plurality of filler particles may have any suitable median particle size and size distribution. In certain embodiments, the plurality of filler particles has a median particle size in the range from about 5 µm to about 7 mm (e.g., about 5 µm to about 5 mm, about 5 µm to about 4 mm, about 5 µm to about 3 mm, about 5 µm to about 2 mm, about 5 µm to about 1 mm, about 5 µm to about 500 µm, about 5 µm to about 300 µm, about 20 µm to about 5 mm, about 20 µm to about 4 mm, about 20 µm to about 3 mm, about 20 µm to about 2 mm, about 20 µm to about 1 mm, about 20 µm to about 500 µm, about 20 µm to about 300 µm, about 100 µm to about 5 mm, about 100 µm to about 4 mm, about 100 µm to about 3 mm, about 100 µm to about 2 mm, about 100 µm to about 1 mm).

In certain preferred embodiments, the filler particles are made from a calcium carbonate-rich material such as limestone (e.g., ground limestone). In certain materials, the filler particles are made from one or more of SiO2-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, calcium carbonate-rich material and magnesium carbonate-rich material.

The weight ratio of (bonding elements):(filler particles) may be any suitable rations dependent on the desired composite material, for example, in the range of about (10 to 50):about (50 to 90).

In certain embodiments, these composite materials may display various patterns, textures and other characteristics, such as visual patterns of various colors. In addition, the composite materials of the invention exhibit compressive strength, flexural strength and water absorption properties similar to conventional concrete or the corresponding natural materials.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%,).

There have been several attempts to reduce the carbon foot print of cement production. In the present disclosure, it is expected that one can react a low lime cement, such as one or more of the precursors described hereinabove, with a reagent chemical that is synthesized from $CO_2$ to make a $CO_2$ composite material. The advantage of this approach is lower $CO_2$ emission in the cement production by about 30% due to synthesis of low lime cement, and additional $CO_2$ consumption during reaction of the reagent chemical synthesized from CO2 with the low lime cement.

The general reaction can be written as:

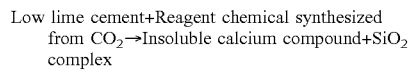
Low lime cement+Reagent chemical synthesized from $CO_2$→Insoluble calcium compound+$SiO_2$ complex In some embodiments, the reaction takes place in the presence of water. In various embodiments, water may or may not be consumed during the reaction depending on the product formed.

One specific example is:

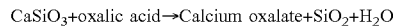
$CaSiO_3$+oxalic acid→Calcium oxalate+$SiO_2$+$H_2O$

This reaction takes place in the presence of water.

Oxalic acid is an organic compound with the formula $H_2C_2O_4$, and the structural formula

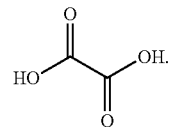

Another specific example is:

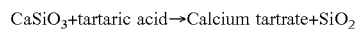
$CaSiO_3$+tartaric acid→Calcium tartrate+$SiO_2$

This reaction takes place in the presence of water.

If water participates in the reaction, the hydrate $CaC_2O_4.H_2O$ may be produced.

Tartaric acid has the chemical formula $C_4H_6O_6$, and the structural formula

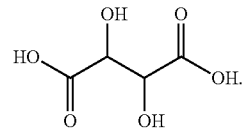

In general, in order to operate according to the principles of the invention, the reagent chemical synthesized from $CO_2$ preferably is sufficiently soluble in water to react with low lime cement, and one reaction product should preferably be an insoluble calcium compound.

In other embodiments, the cementitious precursor my comprise Al (aluminum), Si (silicon), and/or Mg (magnesium), impurities such as Sr (strontium) or Ba (barium) and other metal ions, and the product is an insoluble compound containing one or more of Al, Si, Mg, Sr and Ba.

For reactions that may be exothermic, it is believed that control of such reactions can be accomplished by one or more of: the use of additives, by controlling the reactivity of the cementitious material by controlling its crystallinity, by control of a particle size of particles in the cementitious material, and by control of the surface area of the particles in the cementitious material.

Reaction Rate Control

To control the reaction rate, one approach was to decrease the reactivity of the cement by increasing the melilite content by increasing the Al and/or Mg and/or Fe content of the cement.

EXAMPLE

A 4"×8" cylinder was made with cement comprised of mainly melilite crystalline phase 80%, 5% larnite and 12% amorphous phase. The particle size distribution of the cement was, d10 3 microns, d50 11 microns, and d90 75 microns. The mixture of cement, sand and gravel was mixed with saturated tartaric acid solution and cast into a mold. The sample was cured for two days and tested for compression testing. The strength was 2000 psi.

By making such adjustments to the cementitious material, in some instances the modified cementitious material (e.g., with added Al, Mg and/or Fe) is found not to cure under reaction with only $CO_2$ as the source of carbon dioxide, while it does react when the curing agent is tartaric acid, oxalic acid, or some reagent chemical that is synthesized from $CO_2$.

In other embodiments, the reagent chemical synthesized from $CO_2$ can be an organic acid or a compound that can be synthesized from $CO_2$ alone or possibly with other precursor materials.

In some embodiments, in addition to, or in place of the low-lime cement, conventional cements can also be used, such as OPC, belite cement, or other conventional cements.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method of curing a cementitious material that is cured by reaction with $CO_2$ and does not cure by reaction with water alone, comprising the steps of:
   providing a quantity of the cementitious material that is cured by reaction with $CO_2$ and does not cure by reaction with water alone in uncured form; and
   exposing said cementitious material to a curing agent comprising a reagent chemical that is synthesized from $CO_2$ for a time sufficient to cure said cementitious material.

2. The method of curing a cementitious material of claim 1, wherein said reagent chemical that is synthesized from $CO_2$ is a compound that can be synthesized from $CO_2$.

3. The method of curing a cementitious material of claim 1, wherein said reagent chemical that is synthesized from $CO_2$ is oxalic acid.

4. The method of curing a cementitious material of claim 1, wherein said reagent chemical that is synthesized from $CO_2$ is tartaric acid.

5. The method of curing a cementitious material of claim 1, wherein said reagent chemical that is synthesized from $CO_2$ is water soluble.

6. The method of curing a cementitious material of claim 1, wherein control of the reaction between the cementitious material and the reagent chemical that is synthesized from $CO_2$ is accomplished by one or more of:
   the use of additives,
   by controlling the reactivity of the cementitious material by controlling its crystallinity,
   by control of a particle size of particles in the cementitious material,
   by control of the surface area of the particles in the cementitious material, and
   by control of the composition of the cementitious material.

7. A method of curing a cementitious material, comprising the steps of:
   providing a quantity of a cementitious material comprised of at least one material selected from the group consisting of a calcium silicate, a magnesium silicate, a calcium alumino silicate, a magnesium alumino silicate, gehlenite, and mellilite;
   adding a predetermined quantity of at least one material selected from the group consisting of a material comprising Al content, a material comprising Mg content and a material comprising Fe content of the cementitious material; and
   exposing said cementitious material to a curing agent comprising a reagent chemical that is synthesized from $CO_2$ for a time sufficient to cure said cementitious material.

* * * * *